No. 606,793. Patented July 5, 1898.
W. S. RENNER.
KITCHEN BAKERY CABINET.
(Application filed Dec. 4, 1897.)
(No Model.) 2 Sheets—Sheet 1.
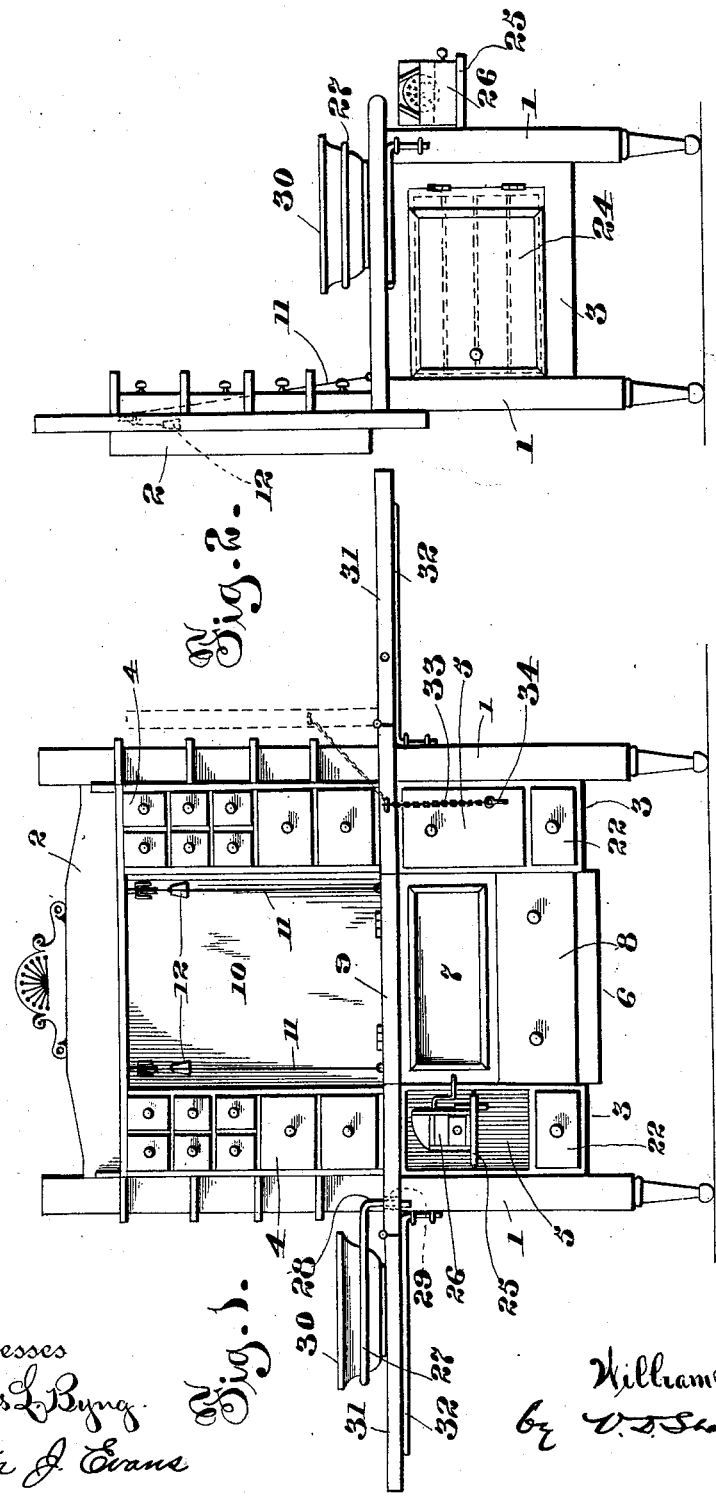
Witnesses
Marcus L. Byng.
Victor J. Evans.
Inventor
William S. Renner
by V. D. Stockbridge
his Attorney.

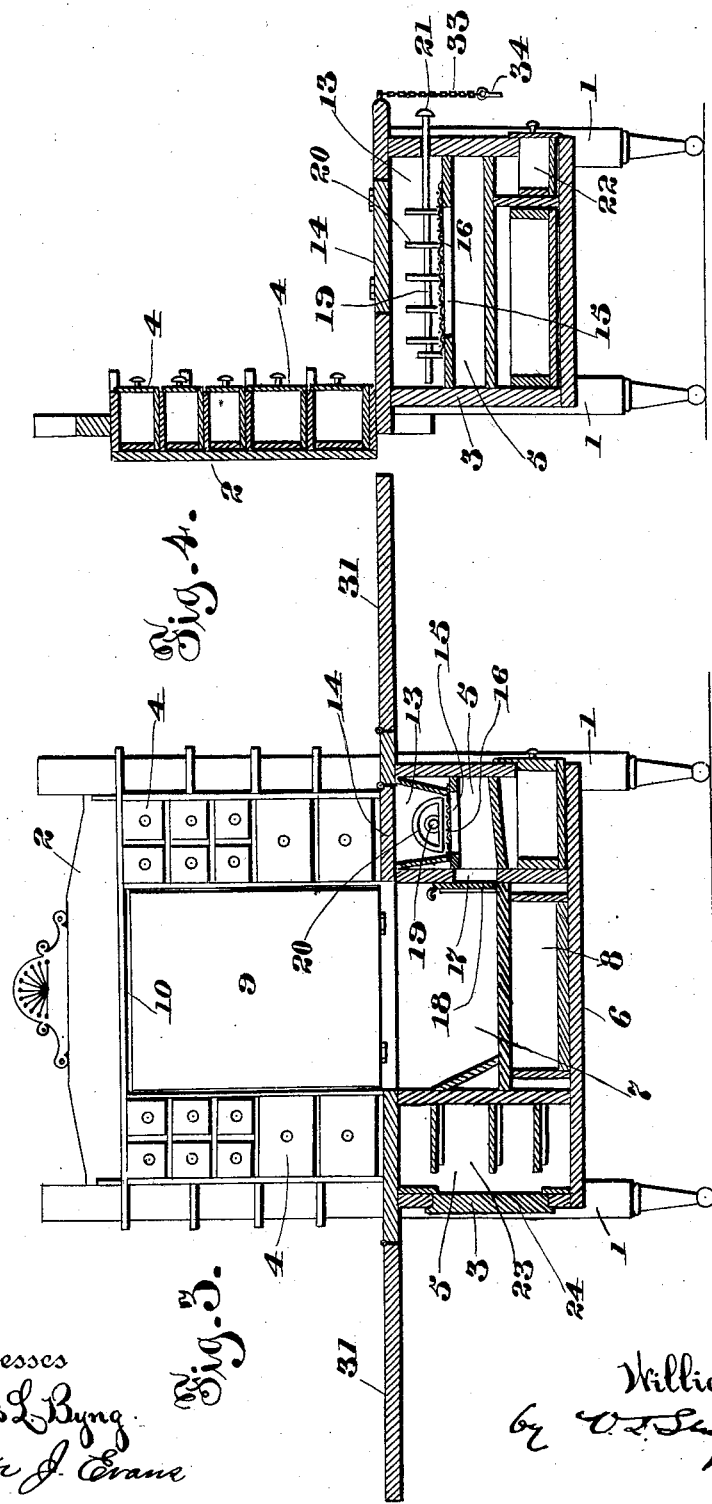

UNITED STATES PATENT OFFICE.

WILLIAM S. RENNER, OF MUNCIE, INDIANA.

KITCHEN BAKERY-CABINET.

SPECIFICATION forming part of Letters Patent No. 606,793, dated July 5, 1898.

Application filed December 4, 1897. Serial No. 660,750. (No model.)

*To all whom it may concern:*

Be it known that I, WILLIAM S. RENNER, a citizen of the United States, residing at Muncie, in the county of Delaware and State of Indiana, have invented certain new and useful Improvements in Kitchen Bakery-Cabinets; and I do hereby declare the following to be a full, clear, and exact description of the invention, such as will enable others skilled in the art to which it appertains to make and use the same.

This invention has reference to what is termed a "kitchen bakery-cabinet," the object being to provide a piece of furniture of this description which is so constructed that it contains all the necessary adjuncts of a bakery, whereby the mixing of the dough and the care of the bread or cake after being baked are made convenient, so that the work and trouble are reduced to a minimum.

The invention consists of the features of construction and combination of parts hereinafter fully described and specifically claimed.

In the accompanying drawings, forming part of this specification, Figure 1 is a front elevation of a cabinet constructed in accordance with this invention. Fig. 2 is an end elevation. Fig. 3 is a vertical longitudinal section. Fig. 4 is a vertical transverse section.

Referring now to said drawings, 1 indicates the legs or corner-posts of the cabinet, and 2 the back piece. The back piece rises from the rear side of the body portion 3 and is provided with a plurality of drawers or compartments 4, that can be used as spice-boxes or to receive sugar, crackers, &c. The body portion 3 is divided into three sections—namely, the outer sections 5 and the central section 6. The central section 6 comprises a dough-box 7 at the upper end thereof and the drawer 8 at the lower end. The dough-box 7 is covered by a removable board 9, which when closed lies flush with the top of each of the side sections 5 and upon the upper side of which the dough is worked. The said dough-board 9 is fitted to be dropped into a pocket 10 at the rear of the dough-box 7 and is controlled by the counterbalancing-weights 11 and cords 12. In this way when the dough-board is raised to permit the dough to be mixed within the box 7 such board can be rocked into the passage 10 to be out of the way, so as not to interfere or stand in front of the drawers or compartments 4. One of the side sections 5 is provided at its upper end with a compartment 13 to receive flour, the top of the section being provided with a door 14, closing the opening into this compartment. The bottom of this compartment slopes toward the opening 15 therein, over which is placed a screen 16. The side of the dough-box adjacent this compartment 13 is cut away, as shown at 17, so that the flour falling through the screened opening can pass into the dough-box, it being noted that a removable plate 18 is employed to close the said opening 17 when the dough is being mixed. Situated within the compartment 13 is a sifter comprising a longitudinally-movable rod 19, having the frames 20, which rest and scrape upon the screen 16. This rod extends through the front side of the cabinet and is provided with a handle 21, by means of which it can be manipulated to move the frames 20 back and forth over the screen to sift the flour therethrough. The said sections of the body portion are provided with suitable drawers 22, which, in connection with the drawer 8, serve as a convenient means for holding pies and cakes, while it is intended to construct drawers wherever a space is available.

At the end of the left-hand side section is shown a compartment 23, having a swinging door 24, and in which suitables shelves are placed. This compartment is to be employed in raising dough or for the purpose of holding bread and biscuits. In raising dough it is found convenient in cold weather to place a pan of hot water within this compartment to hasten the rising, while in warm weather a piece of ice can be placed therein to prevent the dough from rising too rapidly. In the front side of this left-hand section is also illustrated a hinged shelf 25, which is shown as swung outwardly and in a horizontal position to support a grater 26. Upon the top side of this left-hand section is also shown a circular bracket 27, having feet 28, which enter openings 29 in said top, and which serves as a support for mixing-bowls 30.

The top of the body portion, as well as the dough-board, is adapted to be covered by the hinged top pieces 31. These are hinged to both sides of the body portion and when swung inwardly meet each other, so as to provide a cover for the dough-board and flour-compartment and to protect the dough-board, as it is obvious that this is used for one purpose only. The swinging brackets 32 are secured to the sides of the body portion to support these hinged covers 31 in a horizontal position, so that they can serve as a table, while a chain 33, having a pin 34, is employed for holding the top sections 31 in an upright position by inserting the pin 34 in the opening in the side of the top section, as shown in dotted lines in Fig. 1.

It will be seen from the foregoing description that I provide in one piece of furniture all the devices that are necessary in baking, and, furthermore, that they are arranged in a convenient manner, so that the mixing and kneading of the dough can be carried on with a minimum of trouble and labor.

Having thus described the invention, what is claimed as new is—

1. In a kitchen-cabinet, the combination of a central section, a dough-box in the upper part thereof, a movable dough-board for covering the dough-box, side sections, a flour-compartment in one of the side sections, an opening between the side section and the dough-box, compartments in the central and side sections, and hinged covers for covering the central and side sections and dough-board.

2. In a kitchen-cabinet having a central section, the combination of a dough-box situated in the upper part of said central section, a flour-compartment situated at one side thereof and provided with a screened opening at its bottom, a reciprocating sifter adapted to work back and forth upon said screened opening, and a partition between said flour-compartment and dough-box, having an opening, substantially as described.

In testimony whereof I affix my signature in presence of two witnesses.

WILLIAM S. RENNER.

Witnesses:
J. N. HIBNER,
CHAS. M. RENNER.